No. 790,919. Patented May 30, 1905.

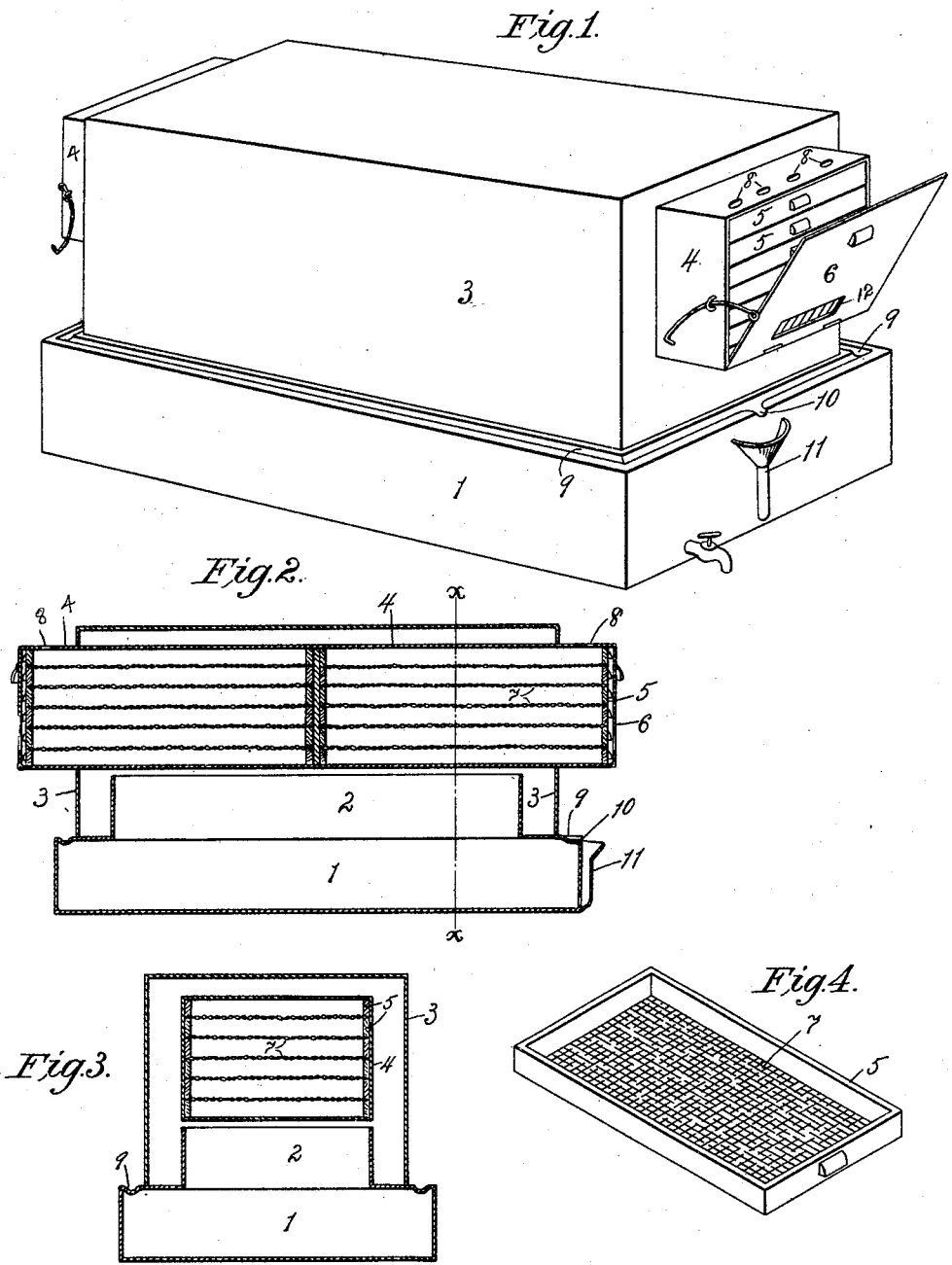

UNITED STATES PATENT OFFICE.

JAMES A. RECTOR, OF KANSAS CITY, KANSAS.

EVAPORATOR.

SPECIFICATION forming part of Letters Patent No. 790,919, dated May 30, 1905.

Application filed November 30, 1904. Serial No. 234,887.

*To all whom it may concern:*

Be it known that I, JAMES A. RECTOR, a citizen of the United States, residing at Kansas City, in the county of Wyandotte and State of Kansas, have invented certain new and useful Improvements in Evaporators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My present invention relates to evaporators, and more particularly to a class of evaporators in which fruit or vegetables are treated by means of a steam application to the vessel in which they are contained.

The object of my invention is to provide a device of the class described which is simple and economical in construction and comprises features of novelty and utility and improved details of structure which will be presently fully described, and pointed out in the claims, reference being had to the drawings forming part of this specification, in which like reference-numerals refer to like parts throughout the several views, and in which—

Figure 1 is a perspective view of an evaporator constructed according to my invention. Fig. 2 is a central longitudinal section of same. Fig. 3 is a transverse sectional view on the line *x x*, Fig. 2. Fig. 4 is a detail view of one of the trays.

Referring more in detail to the drawings, 1 is a tank or boiler, preferably oblong in shape, which may be placed on an ordinary stove. The top of boiler 1 is provided with an upwardly-extending box-like portion 2, the top of which is open. Seated on boiler 1 and surrounding portion 2 is a drum 3, having openings in each of its ends, through which project the ends of a casing 4, which extends through said drum. Casing 4 is provided with a series of inwardly-projecting guides or mess-shelves for carrying the trays 5, and on each end of said casing are hinged doors 6, which may be tightly closed when the evaporator is in use, and in which are suitable draft-openings.

8 8 are perforations in the top of the ends of casing 4 without drum 3.

The bottoms 7 of trays 5 are preferably of wire mesh, although any suitable perforated bottoms may be used which will permit a free circulation of air through the casing.

In the use of my evaporator the boiler is placed on the top of a stove and filled or partially filled with water and the drum containing the casing posited thereon. The fruit to be evaporated is placed in the trays, the trays posited on the shelves in the casing, and the doors 6 closed. As the water in the boiler becomes heated steam generated therefrom rises in the drum, surrounding and heating the inclosed portion of the casing. The heat circulating through the casing draws the moisture from the fruit and allows it to escape through the perforations in the ends of the top of the casing, the draft-openings in the doors assisting in causing a draft through the casing. As the steam escaping from the casing tends to condense and run down the sides of the drum, I provide a groove 9 in the top of the boiler for catching the water, said groove having an outlet 10 emptying into a funnel-shaped cup 11, opening into the interior of the boiler. In this way the water of condensation is returned to the boiler instead of dripping onto the stove or floor.

If so desired, the trays may be of the full length of the casing, or there may be two sets, one entering from each end.

The boiler which I show in connection with my evaporator may be used for other purposes when desired, such as for cooking purposes or as the boiler for a washing-machine.

Having thus described my invention, what I claim as new therein, and desire to secure by Letters Patent, is—

1. An evaporator, comprising a drum provided with openings, a casing carried in and projecting through the openings in said drum, trays posited in said casing, and means for heating the interior of said drum.

2. An evaporator, comprising a boiler, a drum adapted to fit over said boiler, a casing posited in said drum and having its ends projecting beyond said drum, and trays posited in said casing, substantially as set forth.

3. An evaporator, comprising a tank having a central opening in its top provided with upwardly-projecting sides, a drum resting on said tank and surrounding said sides, a casing supported in said drum above said central opening, and trays carried in said casing, substantially as set forth.

4. In combination with an evaporator, a tank having a central opening provided with upwardly-projecting sides, a groove in the top of said tank adjacent to the outer edges, an outlet for said groove, and a cup on the side of said tank beneath said outlet and having an opening into said tank, substantially as set forth.

In testimony whereof I affix my signature in presence of two witnesses.

JAMES A. RECTOR.

Witnesses:
   FREDERICK J. CHASE,
   BENJ. S. BROWN.